(12) United States Patent
Han et al.

(10) Patent No.: US 12,044,528 B2
(45) Date of Patent: Jul. 23, 2024

(54) APPARATUS FOR MEASURING DROPLET LENGTH USING CAPACITIVE ELECTRODE

(71) Applicant: INJE UNIVERSITY INDUSTRY-ACADEMIC COOPERATION FOUNDATION, Gimhae-si (KR)

(72) Inventors: Ki Ho Han, Busan (KR); Jun Hyeong Kim, Gimhae-si (KR)

(73) Assignee: INJE UNIVERSITY INDUSTRY-ACADEMIC COOPERATION FOUNDATION, Gimhae-si (KR)

(*) Notice: Subject to any disclaimer, the term of this patent is extended or adjusted under 35 U.S.C. 154(b) by 328 days.

(21) Appl. No.: 17/595,573

(22) PCT Filed: Oct. 8, 2021

(86) PCT No.: PCT/KR2021/013852
§ 371 (c)(1),
(2) Date: Nov. 19, 2021

(87) PCT Pub. No.: WO2022/080768
PCT Pub. Date: Apr. 21, 2022

(65) Prior Publication Data
US 2023/0086726 A1    Mar. 23, 2023

(30) Foreign Application Priority Data

Oct. 12, 2020    (KR) ........................ 10-2020-0131262

(51) Int. Cl.
*G01B 7/04*    (2006.01)
*G01N 27/22*    (2006.01)

(52) U.S. Cl.
CPC ........... *G01B 7/044* (2013.01); *G01N 27/226* (2013.01)

(58) Field of Classification Search
None
See application file for complete search history.

(56) References Cited

U.S. PATENT DOCUMENTS 8,872,527 B2 * 10/2014 Sturmer ............ B01L 3/502792
324/690
9,321,049 B2 * 4/2016 Sturmer ............... G01N 27/227
(Continued)

FOREIGN PATENT DOCUMENTS

JP    2010-271168 A    12/2010
KR    10-0814083 B1    3/2008
(Continued)

OTHER PUBLICATIONS

Translation of KR 2008-0086177 A (Year: 2008).*
(Continued)

*Primary Examiner* — Jermele M Hollington
(74) *Attorney, Agent, or Firm* — Sughrue Mion, PLLC (57) ABSTRACT

Provided is an apparatus for measuring a droplet length using a capacitive electrode including: a disposable panel; a board separated from the disposable panel and configured to be reused separately from the disposable panel; a sensing electrode unit patterned on an upper surface of the board and configured to measure a length of a droplet depending on a voltage value measured depending on a capacitance value of the fluid passing through the microfluid channel; a thin film provided on a lower surface of the disposable panel; and a negative pressure forming means configured to apply a negative pressure between the disposable panel and the board so that the disposable panel and the board are attached to or detached from each other.

5 Claims, 10 Drawing Sheets

(56) References Cited

U.S. PATENT DOCUMENTS

| | | | |
|---|---|---|---|
| 11,249,003 B2* | 2/2022 | Zhu | G01N 15/1023 |
| 2016/0158752 A1* | 6/2016 | Chiou | B01L 3/502784 |
| | | | 435/29 |
| 2020/0033376 A1* | 1/2020 | Han | G01F 1/6847 |
| 2020/0269237 A1* | 8/2020 | Han | B01L 3/502723 |
| 2021/0023562 A1* | 1/2021 | Mao | B01L 3/502792 |
| 2021/0123941 A1* | 4/2021 | Han | B01L 3/502723 |
| 2023/0234060 A1* | 7/2023 | Han | G01N 35/1016 |
| | | | 422/68.1 |

FOREIGN PATENT DOCUMENTS

| | | | |
|---|---|---|---|
| KR | 10-2008-0086177 A | 9/2008 | |
| KR | 10-2017-0022050 A | 3/2017 | |
| KR | 10-1852719 B1 | 4/2018 | |

OTHER PUBLICATIONS

Translation of JP 2010-271168 A (Year: 2010).*
Translation of KR 2017-0022050 A (Year: 2017).*
Translation of KR 10-1852719 B1 (Year: 2018).*
Office Action dated May 25, 2022 issued by the Korean Patent Office in Korean Application No. 10-2020-0131262.

* cited by examiner

APPARATUS FOR MEASURING DROPLET LENGTH USING CAPACITIVE ELECTRODE

CROSS REFERENCE TO RELATED APPLICATIONS

This application is a National Stage of International Application No. PCT/KR2021/013852, filed Oct. 8, 2021, claiming priority to Korean Patent Application No. 10-2020-0131262, filed Oct. 12, 2020, the entire disclosures of which are incorporated herein by reference.

TECHNICAL FIELD

The present invention relates to an apparatus for measuring a droplet length using a capacitive electrode, and more particularly, to an apparatus for measuring a droplet length using a capacitive electrode, in which a disposable panel having a microfluid channel is separated from a board having a sensing electrode, damage to the electrode and cross contamination in the channel are prevented, the board may be reused, and a length of a droplet may be measured regardless of a speed of the droplet.

BACKGROUND ART

In the related art, as an apparatus for measuring a length of a droplet, there is an impedimetric droplet measurement device that measures a size of a droplet by measuring impedance.

The impedimetric droplet measurement device in the related art measures, in real time, morphological properties of a droplet such as a length or a velocity of the droplet and applies the morphological properties of the droplet to research such as drug delivery, studies on cells, substance synthesis, and chemical reactions.

Figure 13:
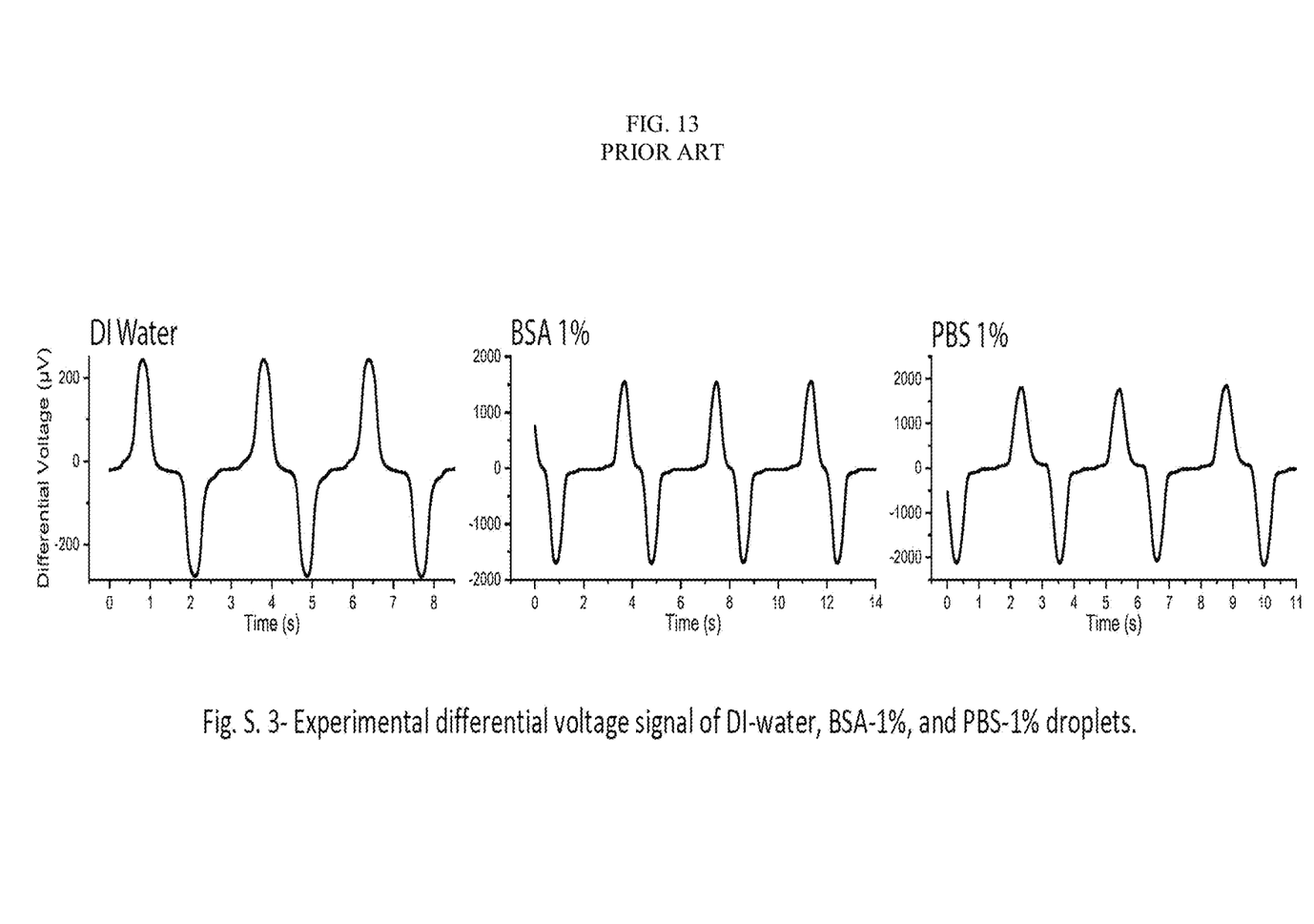
FIG. 13 is a graph illustrating a change in sensing voltage values due to conductivity in an impedimetric droplet measurement device in the related art.

As illustrated in FIG. 13, conductivity of the droplet varies depending on a change in droplet substance, and a voltage (sensing voltage) value varies depending on the conductivity. For this reason, there is a problem in that when the substances have different types of conductivity, it is difficult to measure the length of the droplet only depending on the voltage value.

In addition, variables vary depending on velocities of the droplet, which may affect the measurement of the length of the droplet.

Therefore, in the related art, the length of the droplet is measured under a precondition that the velocity of the fluid is constant. However, for this reason, the precision in measuring the length of the droplet deteriorates.

Meanwhile, a process of manufacturing the impedimetric droplet measurement device in the related art is as follows.

First, gold is deposited on a board, and then a conductivity measuring electrode is patterned by lithography.

Thereafter, a $SiO_2$ oxide film with thickness of 15 nm is deposited by an e-beam evaporator to protect the electrode, and the board is coupled and integrated, by plasma, with a panel made of PDMS.

Since the panel and the board of the droplet measurement device in the related art are integrally manufactured as described above, the fluid comes into direct contact with the electrode, which causes a risk of contamination of the electrode when the board is reused. When the board is discarded after a single use to prevent contamination, there is a problem in that a large loss of cost occurs because the electrode is expensive.

DISCLOSURE

Technical Problem

The present invention has been made in an effort to solve the problem in the related art, and an object of the present invention is to provide an apparatus for measuring a droplet length using a capacitive electrode, in which a disposable panel having a microfluid channel is separated from a board having an electrode to prevent a fluid from coming into direct contact with the electrode, and the electrode is attachable to or detachable from the disposable panel having the microfluid channel by a vacuum, such that the measuring electrode may be reused after use, which reduces a large amount of cost.

Another object of the present invention is to provide an apparatus for measuring a droplet length using a capacitive electrode, which is capable of measuring a length of a droplet as long as the droplets have the same permittivity even though substances have different types of conductivity.

Still another object of the present invention is to provide an apparatus for measuring a droplet length using a capacitive electrode, which is capable of accurately measuring a length of a droplet regardless of a velocity of the droplet.

Technical Solution

One aspect of the present invention provides an apparatus for measuring a droplet length using a capacitive electrode, the apparatus including: a disposable panel having injection ports into which a plurality of fluids having different types of permittivity is injected, a microfluid channel through which the fluids injected through the injection ports pass, and a discharge port from which the fluids passing through the microfluid channel are discharged; a board separated from the disposable panel and configured to be reused separately from the disposable panel; a sensing electrode unit patterned on an upper surface of the board and configured to measure a length of a droplet depending on a voltage value measured depending on a capacitance value of the fluid passing through the microfluid channel; a thin film provided on a lower surface of the disposable panel and configured to separate the disposable panel and the board to prevent a sample passing through the microfluid channel from coming into direct contact with the sensing electrode unit; and a negative pressure forming means configured to apply a negative pressure between the disposable panel and the board so that the disposable panel and the board are attached to or detached from each other, in which the voltage value measured by the electrode increases as the length of the droplet increases when the droplet passes over the sensing electrode unit, and in which the length of the droplet is measured depending on the voltage value measured by the sensing electrode unit.

In the present invention, the microfluid channel may include: unit channel sections through which the fluids injected through the plurality of injection ports flow; a junction channel section in which the fluids passing through the unit channel sections are merged; and a measurement channel section in which the sensing electrode unit measures a droplet length of the sample.

In this case, the sensing electrode unit may be positioned and disposed on a lower portion of the measurement channel section, and the sensing electrode unit may measure the droplet length of the sample passing through the measurement channel section.

In addition, the injection ports may include: an oil injection port into which oil having a low permittivity is injected; and a sample injection port into which the sample having a higher permittivity than the oil is injected, and in the junction channel section, the channel through which the sample flows and the channel through which the oil flows may meet together in directions perpendicular to each other.

Meanwhile, the sensing electrode unit may include: a first electrode positioned in a measurement channel section in a flow direction of the sample; a second electrode installed to be parallel and symmetric to the first electrode; and a sensing electrode configured to detect a signal based on a position of the droplet introduced into the measurement channel section.

The length of the droplet, which is measurable by the sensing electrode unit, may be in a range from a width length of the channel to a length of the first electrode, the minimum measurable length of the droplet may be equal to a channel width, and the maximum measurable length of the droplet may be up to the length of the first electrode.

Advantageous Effects

According to the present invention described above, the disposable panel having the microfluid channel is separated from the board having the electrode to prevent the fluid from coming into direct contact with the electrode, and the electrode is attachable to or detachable from the disposable panel having the microfluid channel by a vacuum, such that the measuring electrode may be reused after use, which may reduce a large amount of cost.

In addition, the droplet length may be measured as long as the permittivity of the droplet is constant even though the substances have different conductivities. Therefore, the apparatus may be more universally used.

In addition, the droplet length may be measured using the capacitive electrode regardless of the velocity of the droplet.

In addition, the apparatus for measuring a length of a droplet is very simple, such that the apparatus may be mass-produced at low cost and used in various fields as various applications.

MODES OF THE INVENTION

Figure 1:
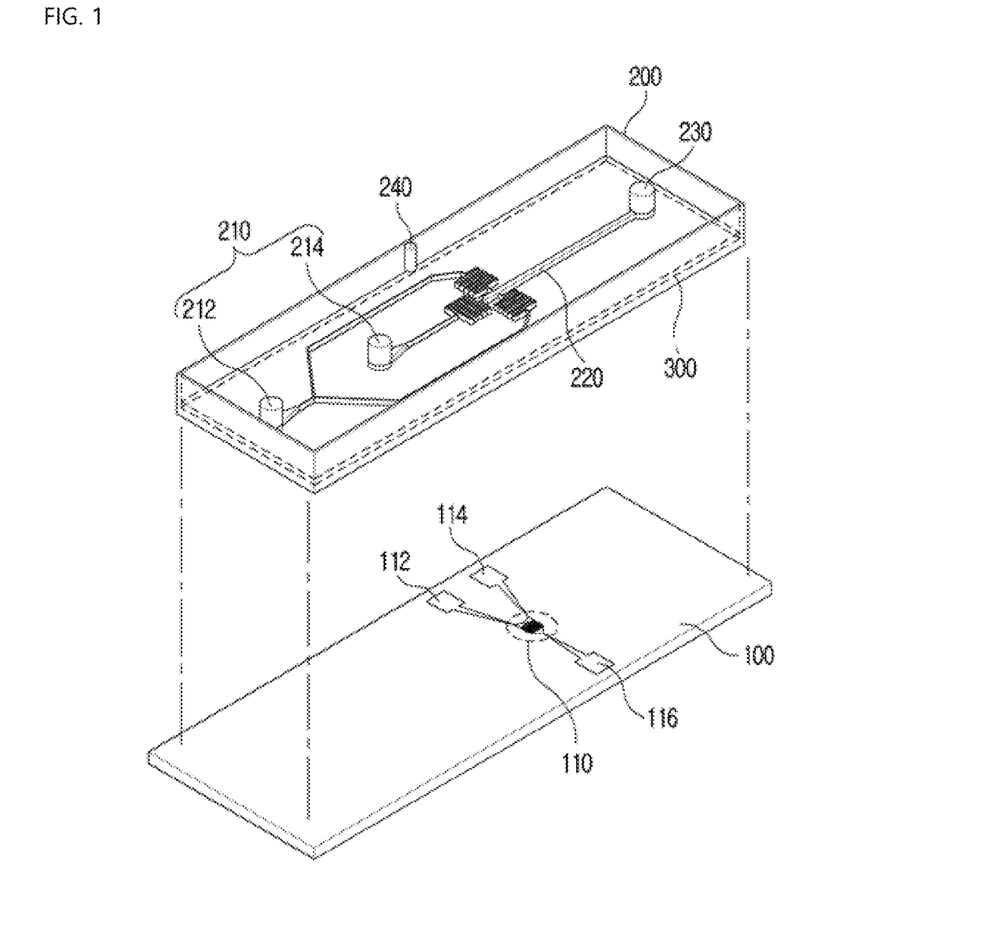
FIG. 1 is an exploded perspective view illustrating an entire configuration of an apparatus for measuring a droplet length using a capacitive electrode according to the present invention.
Figure 2:
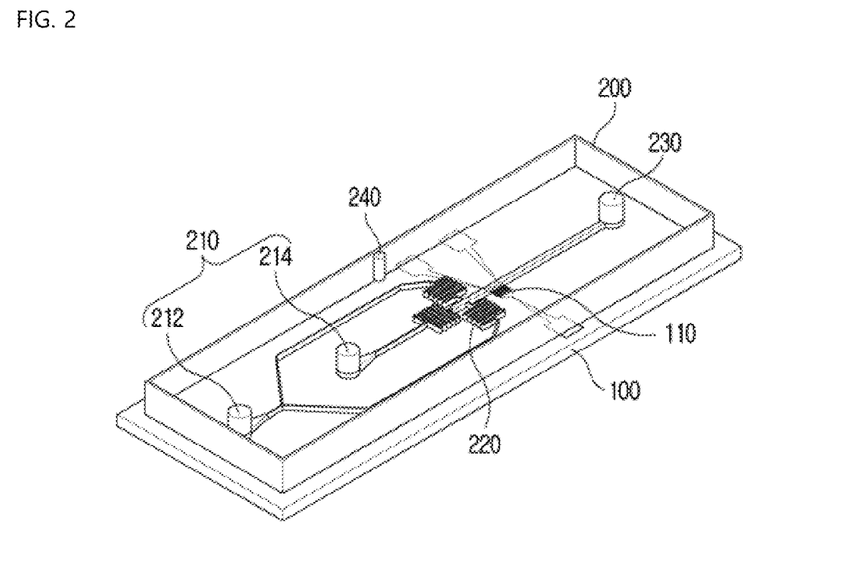
FIG. 2 is a coupled perspective view illustrating the apparatus for measuring a droplet length illustrated in FIG. 1.
Figure 3:
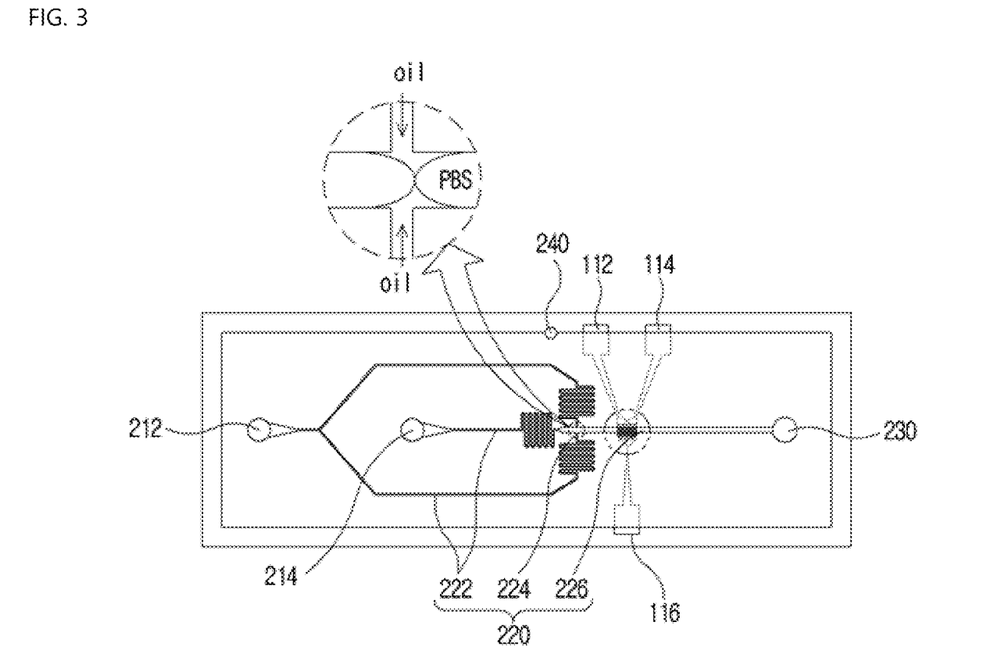
FIG. 3 is a top plan view illustrating the apparatus for measuring a droplet length using a capacitive electrode according to the present invention.
Figure 4:
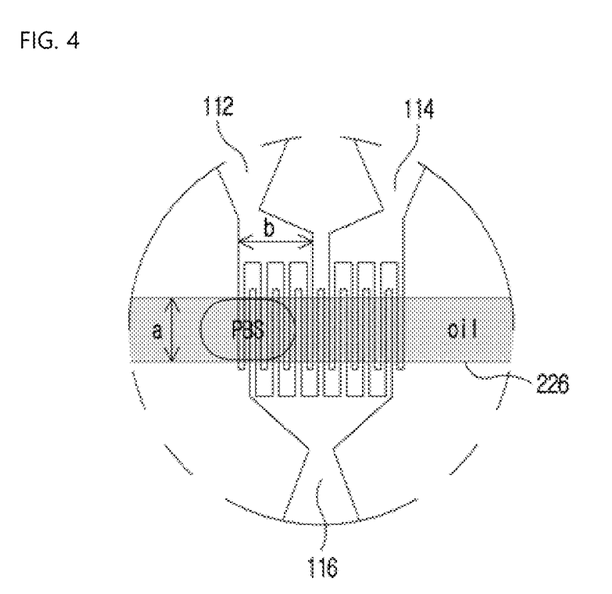
FIG. 4 is an enlarged view illustrating a sensing electrode unit illustrated in FIG. 3.

FIG. 1 is an exploded perspective view illustrating an entire configuration of an apparatus for measuring a droplet length using a capacitive electrode according to the present invention, FIG. 2 is a coupled perspective view illustrating the apparatus for measuring a droplet length illustrated in FIG. 1, FIG. 3 is a top plan view illustrating the apparatus for measuring a droplet length using a capacitive electrode according to the present invention, and FIG. 4 is an enlarged view illustrating a sensing electrode unit illustrated in FIG. 3.

An apparatus for measuring a droplet length using a capacitive electrode according to the present invention broadly includes a disposable panel 200 having a microfluid channel 220, a board 100 separated from the disposable panel 200 and configured to be reused separately from the disposable panel 200, a sensing electrode unit 110 patterned on an upper surface of the board 100, a thin film 300 configured to separate the disposable panel 200 and the board 100, and a negative pressure forming means configured to make the disposable panel 200 and the board 100 attachable or detachable.

As described above, in the present invention, the disposable panel 200 having the microfluid channel 220 is separated from the board 100 having the electrode, which prevents a fluid from coming into direct contact with the electrode and thus allows the measuring electrode to be reused.

The disposable panel 200 may be made of PDMS. To introduce fluids having different types of permittivity, the disposable panel 200 has a plurality of injection ports 210, the microfluid channel 220 through which the fluids injected through the injection port pass, and a discharge port 230 from which the fluids passing through the microfluid channel are discharged.

The microfluid channel 220 is formed in a lower surface of the disposable panel 200. The thin film 300 is attached to the lower surface of the disposable panel 200 so that the electrode may measure a voltage value in a state in which a sample flowing through the microfluid channel 220 is not in direct contact with the electrode of the board 100.

In this case, the thin film 300 needs to have a size including the entire microfluid channel 220 and may be as thin as about 4 μm, for example, so that an electric field, a magnetic force, or the like may be appropriately transmitted to the sample flowing in the microfluid channel 220.

In the present invention, the injection port 210 may be provided in plural so that the fluids having different types of permittivity may be injected. In the embodiment of the present invention, the plurality of injection ports 210 includes an oil injection port 212 into which oil having a low permittivity is injected, and a sample injection port 214 into which the sample having a higher permittivity than the oil is injected.

In addition, as illustrated in FIG. 3, the microfluid channel 220 includes unit channel sections 222 through which the fluids introduced through the plurality of injection ports 212 and 214 flow, a junction channel section 224 in which the fluids passing through the unit channel sections 222 are merged, and a measurement channel section 226 through which the fluids merged in the junction channel section 224 pass so that a droplet length of the sample is measured by the sensing electrode unit 110.

In this case, the unit channel section 222 communicates with the injection port into which the oil or the sample is injected. The unit channel section 222 is connected to the junction channel section 224 which is a point at which the oil and the sample meet together. In the junction channel section, the sample and the oil meet together in directions perpendicular to each other.

As illustrated in the enlarged view in FIG. 3, the channel is formed so that the sample (PBS) may rectilinearly flow from the sample injection port 214 to the discharge port 230. In the junction channel section 224, the channel through which the oil flows is perpendicular to the channel through which the sample flows.

The fluids merged in the junction channel section 224 flow to the measurement channel section 226. In the measurement channel section 226, the sensing electrode unit 110 measures the droplet length of the sample.

The sensing electrode unit 110 is patterned on an upper surface of the board 100 and measures the length of the droplet depending on a voltage value measured from a capacitance value of the fluid passing through the microfluid channel. The sensing electrode unit 110 is positioned and disposed on a lower portion of the measurement channel section 226, such that the sensing electrode unit may measure the droplet length of the sample passing through the measurement channel section.

In this case, since the sample and the electrode are separated by the thin film, the length of the droplet may be measured in the state in which the droplet is not in contact with the sensing electrode unit.

In the present invention, the voltage value measured by the electrode increases as the length of the droplet increases when the droplet passes through the sensing electrode unit 110. Therefore, the length of the droplet is measured on the principle that the length of the droplet is measured depending on the voltage value measured by the sensing electrode unit 110.

That is, an electric field is formed on the channel at normal times. When the oil flows, the permittivity is lowered, such that no current is measured. When the sample flows, the current flows, and the sensing electrode unit detects the flow of current, thereby measuring the length of the droplet.

Meanwhile, the sensing electrode unit 110 may include a first electrode 112 positioned in the measurement channel section 226 in a flow direction of the sample, a second electrode 114 installed to be parallel and symmetric to the first electrode 112, and a sensing electrode 116 configured to detect a signal based on a position of the droplet introduced into the measurement channel section.

As illustrated in FIG. 4, the first electrode 112 and the second electrode 114 are symmetrically installed side by side, and the sensing electrode 116 configured to detect the signal is installed opposite to the first electrode 112 and the second electrode 114.

In this case, the length of the droplet, which may be measured by the sensing electrode unit 110, is in a range from a width length (a) of the channel 226 to a length (b) of the first electrode 112. The minimum measurable length of the droplet is equal to the channel width (a), and the maximum measurable length of the droplet is up to the length (b) of the first electrode.

In the embodiment of the present invention, the length of the droplet may be measured up to 260 μm which is the length of the first electrode C1, and the minimum measurable length of the droplet may be the channel width of 100 μm.

However, the present invention is not limited thereto because the width length (a) of the channel 226 and the length (b) of the first electrode 112 may be variously applied in accordance with the embodiment.

Meanwhile, the present invention includes the negative pressure forming means for applying a negative pressure between the disposable panel and the board so that the disposable panel 100 and the board 200 are attached to or detached from each other. The negative pressure forming means includes a negative pressure applying hole 240 which communicates with a portion where the board 100 and the disposable panel 200 adjoin. The negative pressure applying hole 240 sucks the board and the disposable panel as the negative pressure is applied.

The negative pressure applying hole 240 may be connected to an external device and apply the negative pressure, and a detailed description thereof will be omitted.

Figure 5:
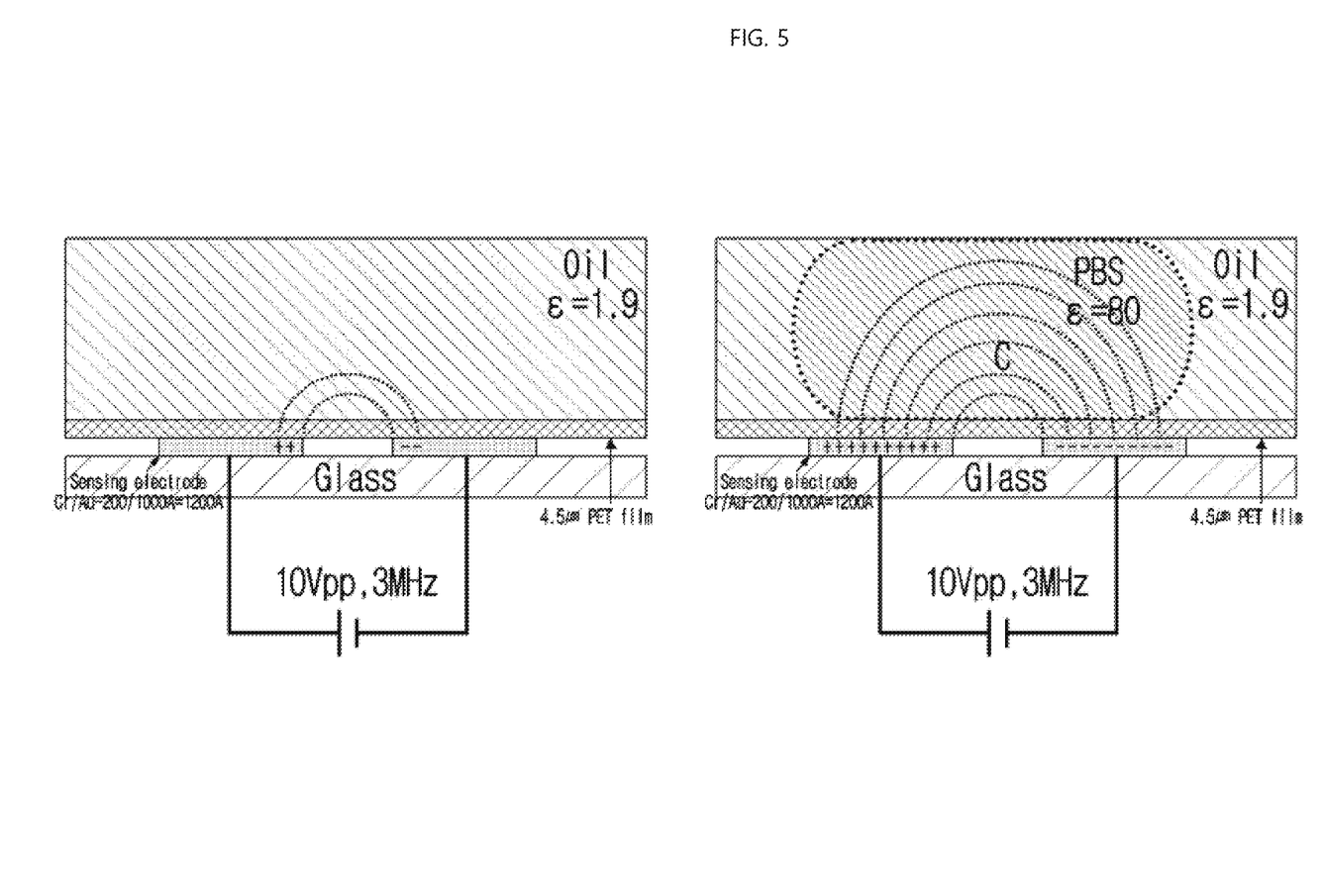
FIG. 5 is a cross-sectional view illustrating a change in electric field density due to a permittivity difference.

FIG. 5 is a cross-sectional view illustrating a change in electric field density due to a permittivity difference. When the oil flows over the electrode, the oil serves as a medium between capacitances.

However, because the oil has a low permittivity, the capacitance of the oil is small, and the voltage is less measured.

However, as illustrated in the right view, when the sample (PBS) having high permittivity flows over the electrode, the sample (PBS) serves as a medium, and the capacitance value increases, such that the voltage is measured.

A function of the apparatus for measuring a droplet length according to the present invention configured as described above will be described below with reference to experimental results.

Figure 6:
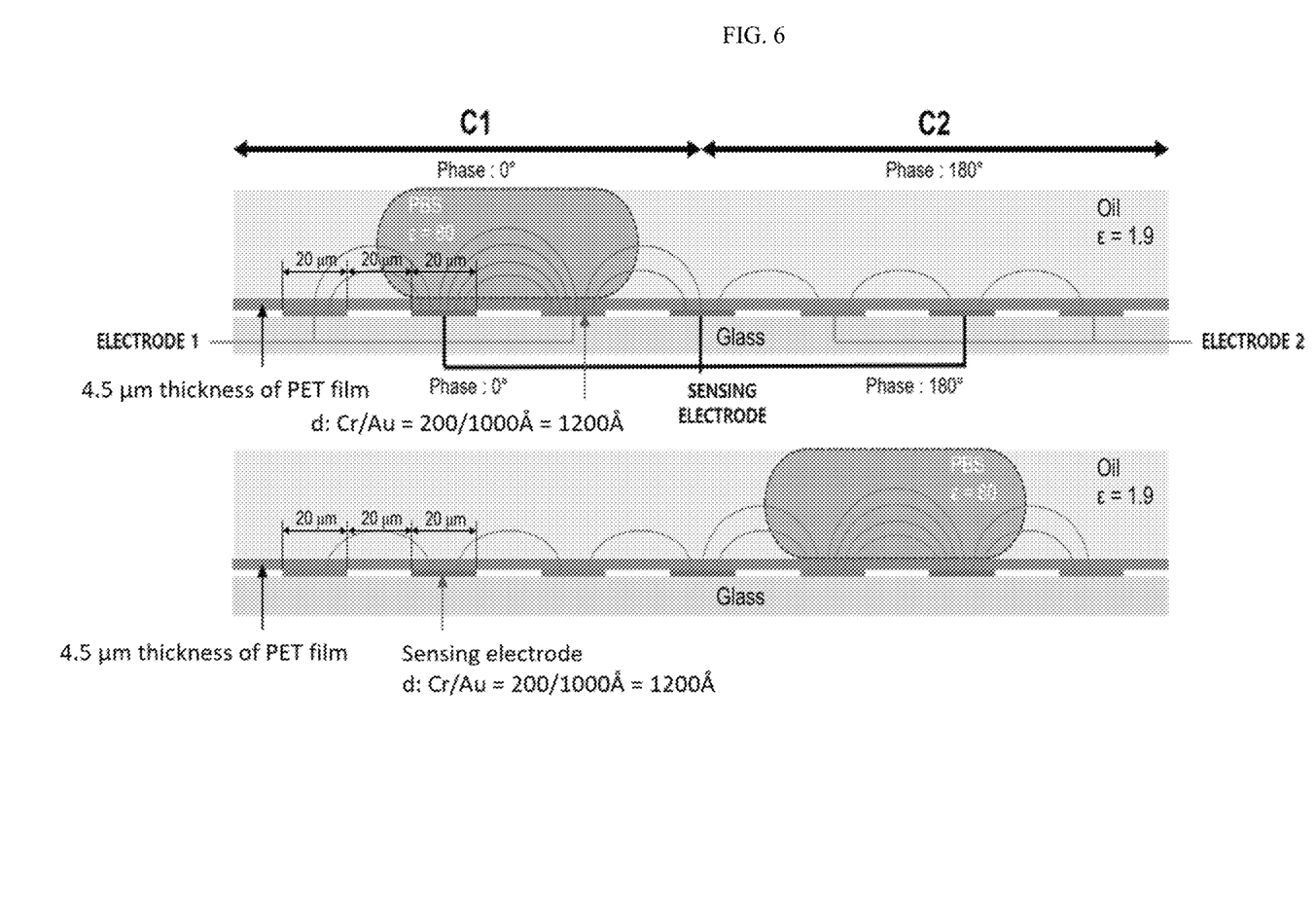
FIG. 6 is a view illustrating a change in capacitance based on a droplet position.

FIG. 6 is a view illustrating a change in capacitance based on a droplet position.

When the droplet passes over the electrode in the state in which the first electrode, the sensing electrode, and the second electrode are arranged, the electric field generated by the electrode increases as the length of the droplet increases, such that the capacitance increases, and the measured voltage (sensing voltage) value increases.

In this case, the measurable length of the droplet increases as the length of the first electrode C1 and the length of the second electrode C2 increase.

Figure 7:
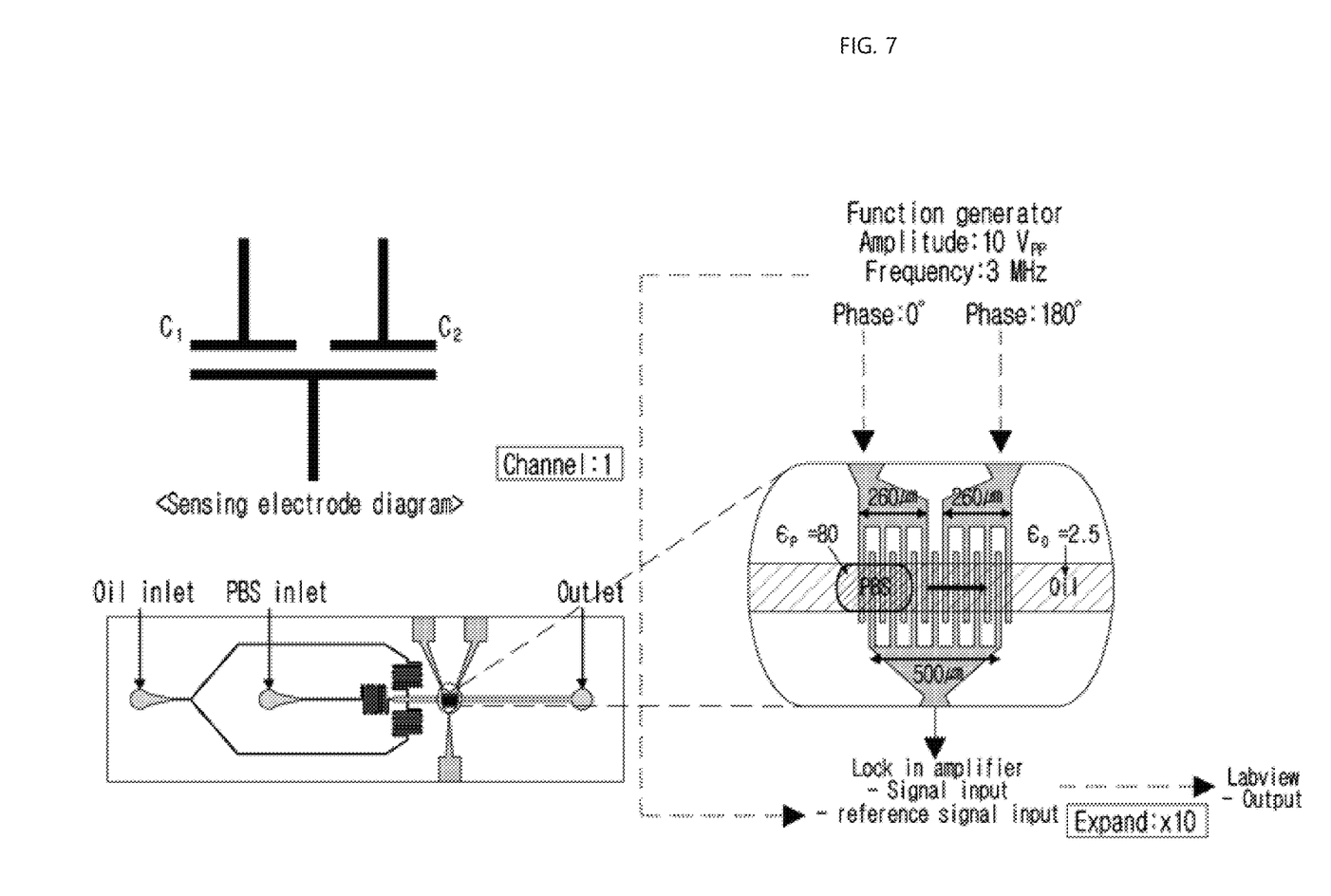
FIG. 7 is an enlarged view illustrating in detail an electrode structure for measuring a droplet length.
Figure 8:
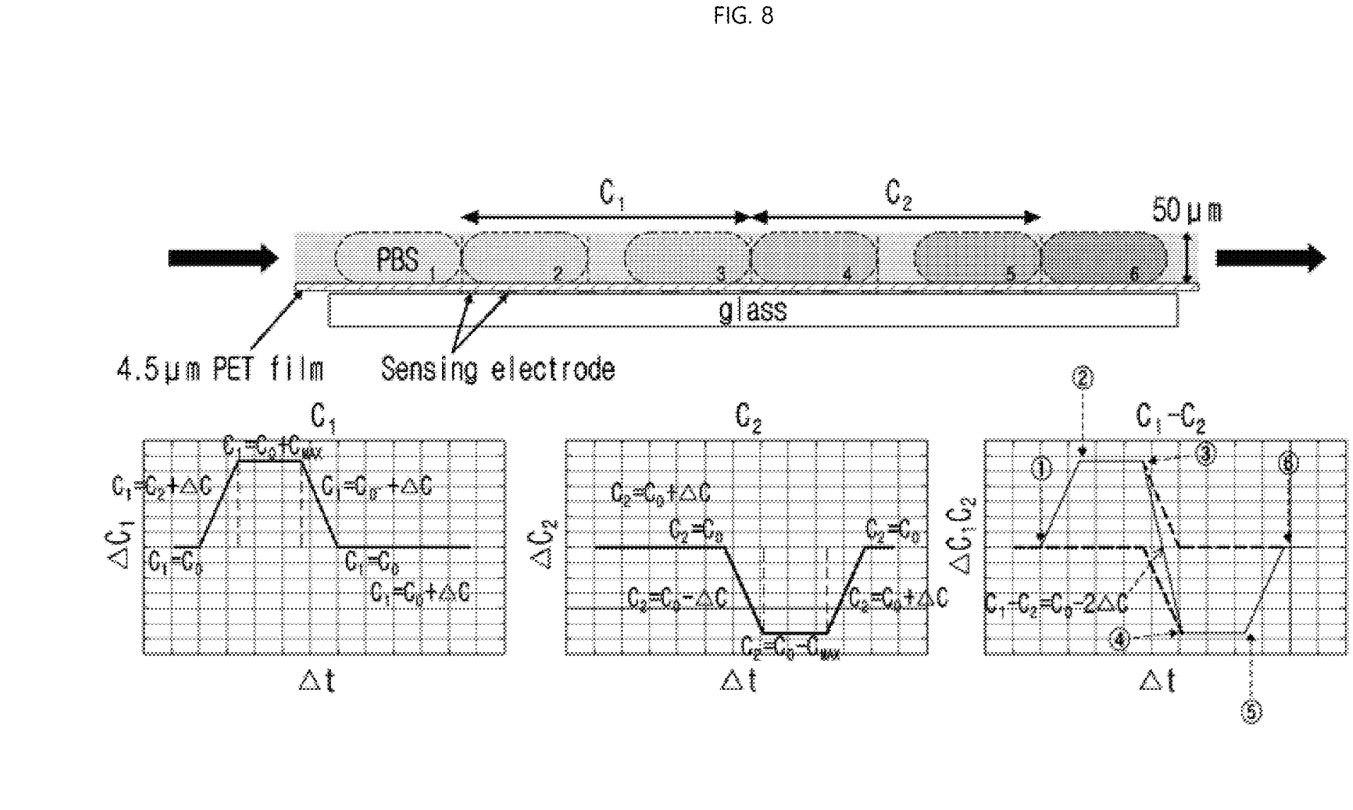
FIG. 8 is a graph illustrating an output of a detection signal based on a droplet position according to the embodiment of the present invention.

FIG. 7 is an enlarged view illustrating in detail an electrode structure for measuring a droplet length, and FIG. 8 is a graph illustrating an output of a detection signal based on a droplet position according to an embodiment of the present invention.

The picture and the graph in FIG. 8 illustrate the output of the detection signal that varies while the fluid passes over the capacitive electrode and illustrate moment 1 when the droplet enters region C1, moment 2 when the droplet is completely introduced into region C1, moment 3 when the droplet departs from region C1 and enters region C2, moment 4 when the droplet is completely introduced into region C2, moment 5 when the droplet begins to depart from region C2, and moment 6 when the droplet completely departs from region.

Figure 9:
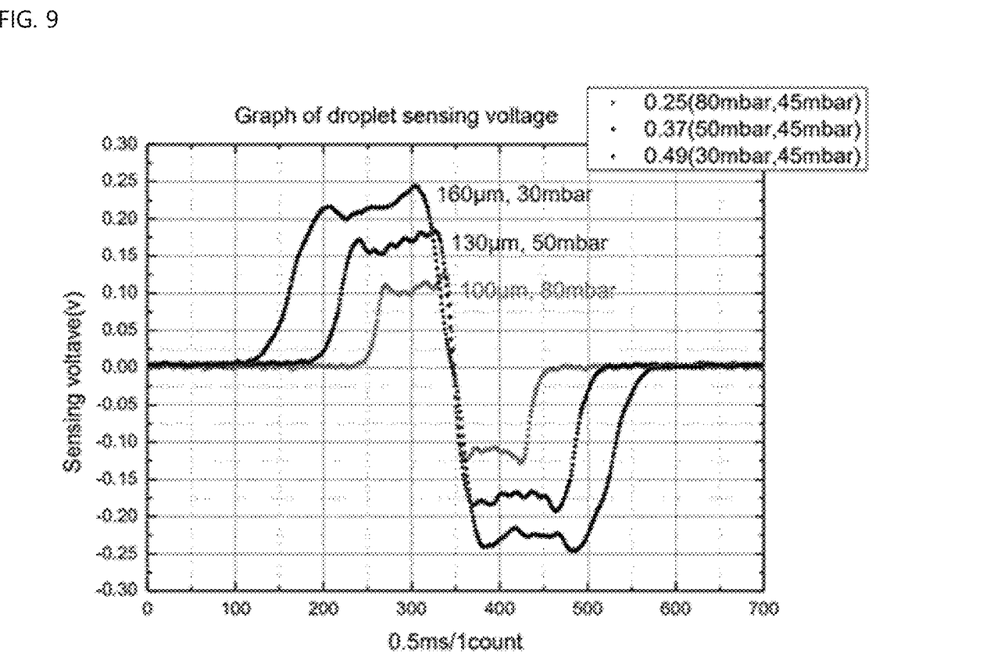
FIG. 9 is a graph illustrating a detection signal of an actual electrode.

FIG. 9 is a graph illustrating a detection signal of an actual electrode.

The sensing graph measured for each droplet length is as follows.

100 um: 0.25 v
130 um: 0.37 v
160 um: 0.49 v

In this case, the reason why the measurement time increases as the droplet length increases is that a size of the droplet is adjusted by changing a flow velocity of the oil, and the droplet length increases as the flow velocity of the oil decreases. Therefore, the time for which the droplet passes over the electrode increases as the droplet length increases.

Figure 10:
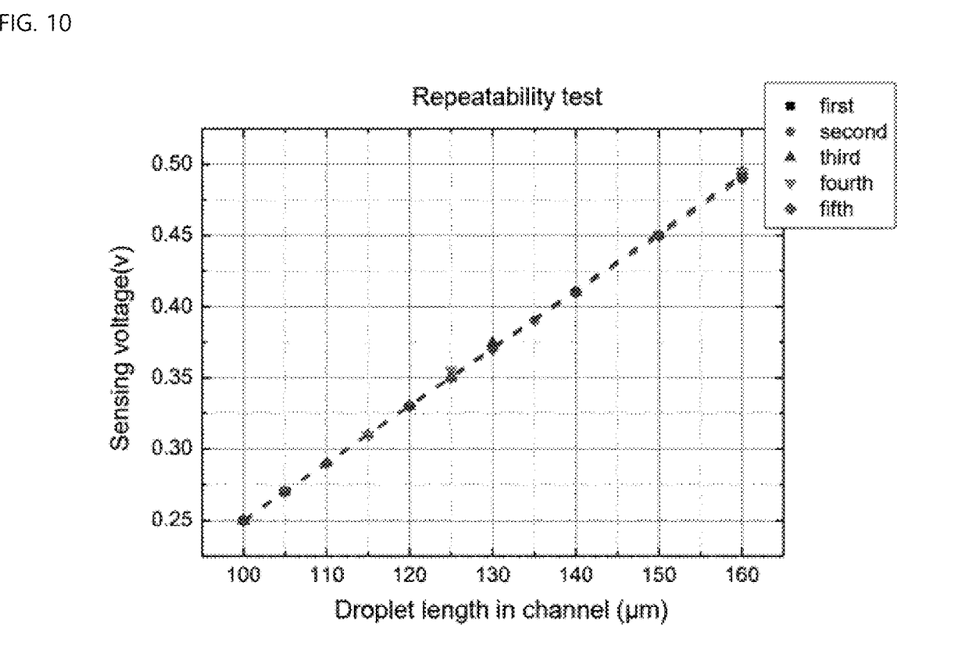
FIG. 10 is a graph illustrating a result of a reproducibility test for a disposable microfluid channel device.

FIG. 10 is a graph illustrating a result of a reproducibility test for a disposable microfluid channel device.

In this case, as described above, the sensing voltage value for each droplet length should not be changed even though the plurality of disposable microchannel devices is used. This is checked by a test.

According to the test result, it can be seen that the value is less changed even though five devices is used.

Figure 11:
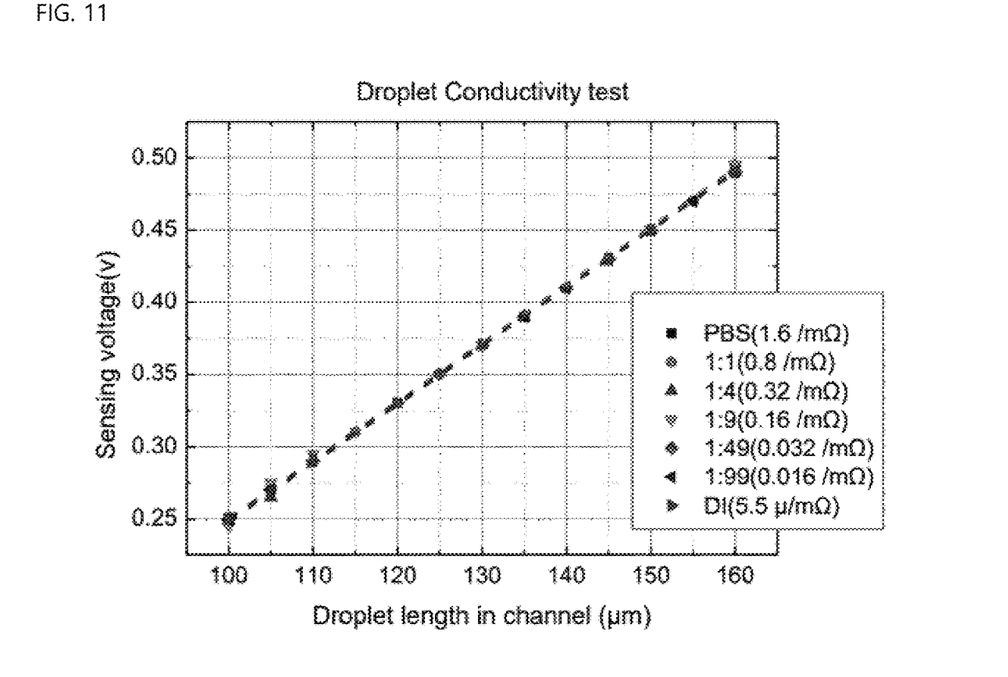
FIG. 11 is a graph illustrating a detection signal change test in accordance with conductivity.

FIG. 11 is a graph illustrating a detection signal change test in accordance with conductivity.

The capacitance value varies depending on the permittivity, a distance between the electrodes, and an interval between the electrodes. Therefore, the sensing voltage does not change even though the conductivity changes.

According to the result of the test performed by changing the conductivity of the droplet, it can be seen that the value is not changed.

Consequently, the droplet length may be measured as long as the permittivity is constant without necessity of collecting database even though the substances have different conductivities.

Figure 12:
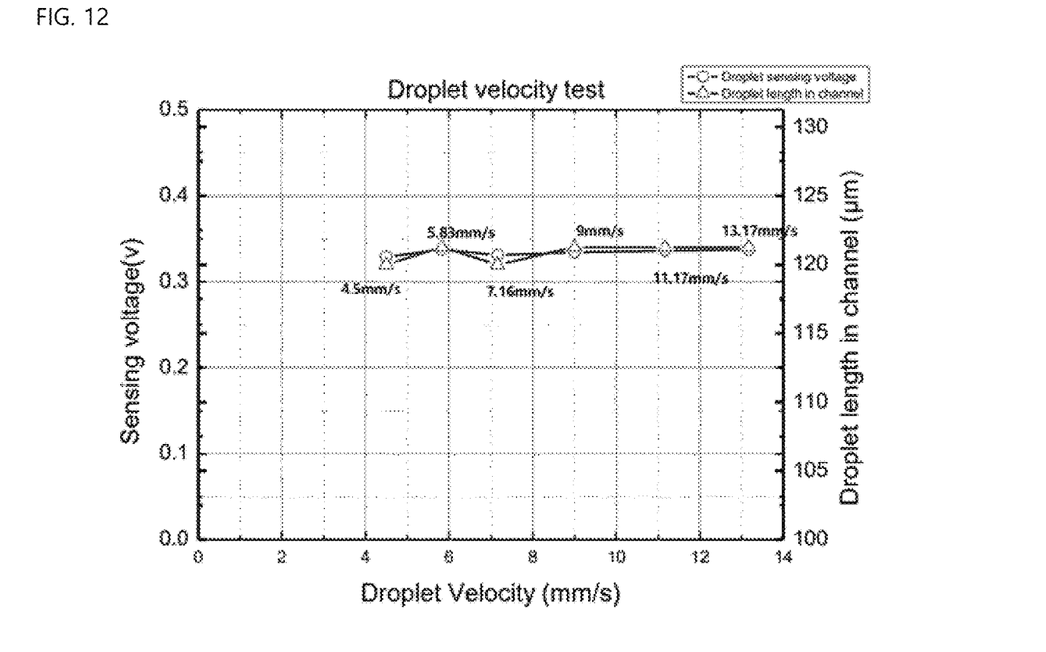
FIG. 12 is a graph illustrating a detection signal change test in accordance with a droplet velocity.

FIG. 12 is a graph illustrating a detection signal change test in accordance with a droplet velocity.

According to the result of the test performed by measuring the sensing voltage while changing only the velocity and maintaining the same droplet length, it can be seen that the sensing voltage value does not change even though the velocity of the droplet changes.

That is, the length may be measured regardless of the velocity of the droplet.

The invention claimed is:

1. An apparatus for measuring a droplet length using a capacitive electrode, the apparatus comprising:
   a disposable panel having injection ports into which a sample comprising a plurality of fluids having different types of permittivity is injected, a microfluid channel through which the fluids injected through the injection ports pass, and a discharge port from which the fluids passing through the microfluid channel are discharged;
   a board separated from the disposable panel and configured to be reused separately from the disposable panel;
   a sensing electrode unit patterned on an upper surface of the board and configured to measure a length of a droplet depending on a voltage value measured depending on a capacitance value of the fluid passing through the microfluid channel;
   a thin film provided on a lower surface of the disposable panel and configured to separate the disposable panel and the board to prevent the sample passing through the microfluid channel from coming into direct contact with the sensing electrode unit; and
   a negative pressure forming means configured to apply a negative pressure between the disposable panel and the board so that the disposable panel and the board are attached to or detached from each other,
   wherein the voltage value measured by the sensing electrode increases as the length of the droplet increases when the droplet passes over the sensing electrode unit,
   wherein the length of the droplet is measured depending on the voltage value measured by the sensing electrode unit, and
   wherein the sensing electrode unit comprises:
   a first electrode positioned on a measurement channel section of the microfluid channel;
   a second electrode installed on the measurement channel section of the microfluid channel such that the first electrode and the second electrode are symmetrically installed side by side allowing the sample to pass over the first electrode and the second electrode sequentially; and
   a sensing electrode configured to detect a signal based on a position of the droplet introduced into the measurement channel section.

2. The apparatus of claim 1, wherein the microfluid channel comprises:
   unit channel sections through which the fluids injected through the plurality of injection ports flow;
   a junction channel section in which the fluids passing through the unit channel sections are merged; and
   the measurement channel section in which the sensing electrode unit measures a droplet length of the sample.

3. The apparatus of claim 2, wherein the sensing electrode unit is positioned and disposed on a portion of the thin film where a lower portion of the measurement channel section is provided, and the sensing electrode unit measures the droplet length of the sample passing through the measurement channel section.

4. The apparatus of claim 2, wherein the injection ports comprise:
   an oil injection port into which oil having a low permittivity is injected; and
   a sample injection port into which the sample having a higher permittivity than the oil is injected, and
   wherein in the junction channel section, the channel through which the sample flows and the channel through which the oil flows meet together in directions perpendicular to each other.

5. The apparatus of claim 1, wherein the length of the droplet, which is measurable by the sensing electrode unit, is in a range from a width length of the channel to a length of the first electrode, the minimum measurable length of the droplet is equal to a channel width, and the maximum measurable length of the droplet is up to the length of the first electrode.

* * * * *